United States Patent
Le

(10) Patent No.: US 11,271,373 B2
(45) Date of Patent: Mar. 8, 2022

(54) DUST-PROOF SWITCH CABINET IN LOW-VOLTAGE

(71) Applicant: NINGBO GONGSHENG ELECTRIC TECHNOLOGY CO., LTD, Zhejiang Province (CN)

(72) Inventor: Chaohua Le, Zhejiang Province (CN)

(73) Assignee: NINGBO GONGSHENG ELECTRIC TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 17/091,942

(22) Filed: Nov. 6, 2020

(65) Prior Publication Data

US 2021/0242666 A1    Aug. 5, 2021

(30) Foreign Application Priority Data

Dec. 31, 2019    (CN) .......................... 201922500318.7

(51) Int. Cl.
| | |
|---|---|
| *H02B 1/28* | (2006.01) |
| *A47B 88/467* | (2017.01) |
| *H02B 1/36* | (2006.01) |
| *H02B 1/30* | (2006.01) |

(52) U.S. Cl.
CPC ............ *H02B 1/28* (2013.01); *A47B 88/467* (2017.01); *H02B 1/30* (2013.01); *H02B 1/36* (2013.01)

(58) Field of Classification Search
CPC .... H02B 1/28; H02B 1/30; H02B 1/36; A47B 88/467
See application file for complete search history.

(56) References Cited

U.S. PATENT DOCUMENTS

| | | | | |
|---|---|---|---|---|
| 905,544 | A | * | 12/1908 | Lambert et al. ...... A47B 88/467 312/319.1 |
| 2,852,882 | A | * | 9/1958 | David ..................... H04M 1/21 312/348.5 |
| 7,901,017 | B1 | * | 3/2011 | Kafferlin .............. A47B 88/467 312/221 |

FOREIGN PATENT DOCUMENTS

| | | | |
|---|---|---|---|
| JP | 2002276710 A | * | 9/2002 |
| TR | 201512509 A1 | * | 4/2017 |

* cited by examiner

*Primary Examiner* — Robert J Hoffberg
(74) *Attorney, Agent, or Firm* — Tarolli, Sundheim, Covell & Tummino LLP

(57) ABSTRACT

The present patent discloses a dust-proof switch cabinet in low-voltage comprises a low-voltage switchgear cabinet on which a plurality of unit drawers are arranged, wherein the unit drawers are provided with a drawer stop door located on the outside and a drawer side panel located on both sides, and a plurality of elastic tensioning members respectively matched with the corresponding unit drawers are provided in the low-voltage switchgear cabinet, wherein the elastic tensioning members are inserted into the inner cavity of the unit drawers and connected with the low-voltage switchgear cabinet, and the movable end of the elastic tensioning members are connected with the unit drawers. The present patent has the effect of effectively avoids the accumulation of particles and debris in the drawers caused by the unit drawers being opened for a long-time, thereby significantly improving the dustproof performance of the low-voltage switchgear cabinet.

6 Claims, 3 Drawing Sheets

A

DUST-PROOF SWITCH CABINET IN LOW-VOLTAGE

RELATED APPLICATIONS

The present invention is a Nonprovisional Application under 35 USC 111(a), claiming priority to Serial No. CN 201922500318.7, filed on 31 December, the entirety of which is incorporated herein by reference.

TECHNICAL FIELD

The present patent relates to the technical field of switchgear cabinets, more specifically relates to a dust-proof switch cabinet in low-voltage.

BACKGROUND ART

As a commonly used power distribution cabinet, low-voltage switchgear has a wide range of applications in the industry. The cabinet body of the low-voltage switchgear includes a frame. The frame includes a column, upper and lower beams located at the upper and lower ends of the column, and an intermediate beam connected to the column and arranged transversely. Among the common low-voltage switchgear cabinets, low-voltage drawer cabinets are widely used because of their clear classification and convenience in operation.

The Chinese patent of publication number CN205319597U discloses a low-voltage drawer cabinet. The low-voltage drawer cabinet includes a cabinet body, a high-voltage access circuit and a side plate. The cabinet body has at least two drawer cavities, and each drawer cavity is provided with a drawer and a guide rail, the high-voltage access circuit is arranged vertically; the side plate includes a first side plate and a second side plate, and the first side plate and the second side plate are riveted; the low voltage drawer cabinet further includes: terminal one of a high-voltage output, which is set on the rear side plate of the drawer; terminal two of the high-voltage output, which is set on the rear side plate of the cabinet cavity, the terminal one of the high-voltage output is inserted into the terminal two of the high-voltage output; an insulating cover, which is sleeved on the periphery of each wiring column of the terminal two of the high-voltage output.

However, when the drawer of the low-voltage drawer cabinet is used, the drawer will be in a long-time open state due to the drawer is being pushed back, which will cause the accumulation of particles and debris in the drawer and affect the normal use of the low-voltage drawer cabinet, and this needs improvement.

SUMMARY OF THE INVENTION

In view of the deficiencies in the prior art, the purpose of the present patent is to provide a dust-proof switch cabinet in low-voltage, which has the effect of significantly improving the dust-proof performance.

In order to achieve the above purpose, the present patent provides the following technical solutions:

A dust-proof switch cabinet in low-voltage, which comprises a low-voltage switchgear cabinet, and a plurality of unit drawers are arranged on the low-voltage switchgear cabinet, wherein the unit drawers are provided with a drawer stop door located on the outside and a drawer side panel located on both sides. A plurality of elastic tensioning members respectively matched with the corresponding unit drawers are further provided in the low-voltage switchgear cabinet, wherein the elastic tensioning members are inserted into the inner cavity of the unit drawers and connected with the low-voltage switchgear cabinet, and the movable end of the elastic tensioning members are connected with the unit drawers, and when the unit drawers are drawn out from the low-voltage switchgear cabinet, the elastic potential energy of the elastic tensioning members gradually increases.

By adopting the above technical solution, when the unit drawers are drawn out from the low-voltage switchgear cabinet, the elastic potential energy of the elastic tensioning members gradually increases as the unit drawers are drawn out, thereby forming a tendency of the unit drawers to move into the low-voltage switch cabinet. And after the unit drawers are used, the unit drawers will be reset under the action of the elastic tension members, so as to avoid the accumulation of particles and debris in the drawers due to the unit drawers being opened for a long-time, and significantly improve the dustproof performance of the low-voltage switchgear cabinet.

The patent is further arranged as: the elastic tensioning member is a clockwork.

By adopting the above-mentioned technical solution, the clockwork uses its elastic force to generate power when it is gradually loosened. According to the principle of lever moment, when the clockwork is fully wound up, the maximum moment is generated due to the longest moment lever is achieved, so the front end of the clockwork needs to be output with small force; after running for a period of time, the clockwork that is tightly wound on the clockwork shaft will slowly loosen, causing the energy of the clockwork to decrease, and when the energy is about to run out, due to the shortest moment lever which makes the moment at its end the smallest, and the output force at this time also becomes smaller; the purpose of stable control of the reset of the unit drawers is achieved.

The patent is further arranged as: the elastic tensioning members are rotatably connected with an adapter fixing piece for connecting with the low-voltage switchgear cabinet at the axis, and the rotation range of the elastic tensioning members relative to the adapter fixing piece is 0°-90°.

By adopting the above technical solution, the elastic tensioning members are rotatably connected with the adapter fixing piece, so the use stability of the elastic tensioning members will be significantly improved, and their service life will be effectively prolonged.

The patent is further arranged as: the upper end of the adapter fixing piece is fixedly connected to the low-voltage switchgear cabinet, and the lower end of the adapter fixing piece is rotatably connected with an adapter arm, and the lower end of the adapter arm is rotatably connected with the elastic tensioning members.

By adopting the above technical solution, the elastic tensioning members are first rotatably connected with the adapter arm, and then rotatably connected with the adapter fixing piece through the adapter arm, achieving the effect of further improving the use stability of the elastic tensioning members.

The patent is further arranged as: it further includes a magnetic fixing piece which is fixed on the low-voltage switchgear cabinet, an alarm light is arranged on the unit drawers, and a magnetic piece is arranged on the adapter arm, wherein the magnetic fixing piece is provided with a matching piece which matches the magnetic piece, and the magnetic piece is connected to a switchgear which controls the magnetic attraction of the matching piece with the magnetic piece, and when the magnetic piece is magnetically connected with the matching piece, the alarm light is turned on.

By adopting the above technical solution, when the unit drawers are withdrawn from the low-voltage switchgear cabinet, the magnetic piece abuts against the matching piece with the rotation of the adapter arm. At this time, the magnetic piece and the matching piece are magnetically fixed by the switchgear, which will turn on the alarm light and achieves the purpose of reminding the unit drawers are in the open state.

The patent is further arranged as: the matching piece is an iron block, and the magnetic piece is an electromagnet.

In summary, the present patent has the following beneficial effects: the unit drawers drawn out from the low-voltage switchgear cabinet have a tendency to move into the low-voltage switchgear cabinet through the restoring force generated on the clockwork, and after the unit drawers are used, the unit drawers will be reset under the action of the clockwork's restoring force, so as to avoid the accumulation of particles and debris in the drawers due to the unit drawers being opened for a long time, and to significantly improve the dustproof performance of the low-voltage switchgear cabinet.

DESCRIPTION OF ACCOMPANIED FIGURES

THE CORRESPONDING REFERENCE NUMERAL PARTS IN THE ACCOMPANIED FIGURES ARE

1. Low-voltage switchgear cabinet; 2. Unit drawers; 21. Drawer stop door; 22. Drawer side panel; 23. Adapter fixing piece; 24. Magnetic fixing piece; 25. Adapter arm; 26. Magnetic piece; 27. Matching piece; 3. Locking push-pull mechanism; 4. Movement guide rail; 5. Elastic tensioning member

DETAILED IMPLEMENTATION METHOD

In order to make the technical solutions and advantages of the patent clearer, the patent will be further described in detail below in conjunction with the accompanied figures.

Figure 1:
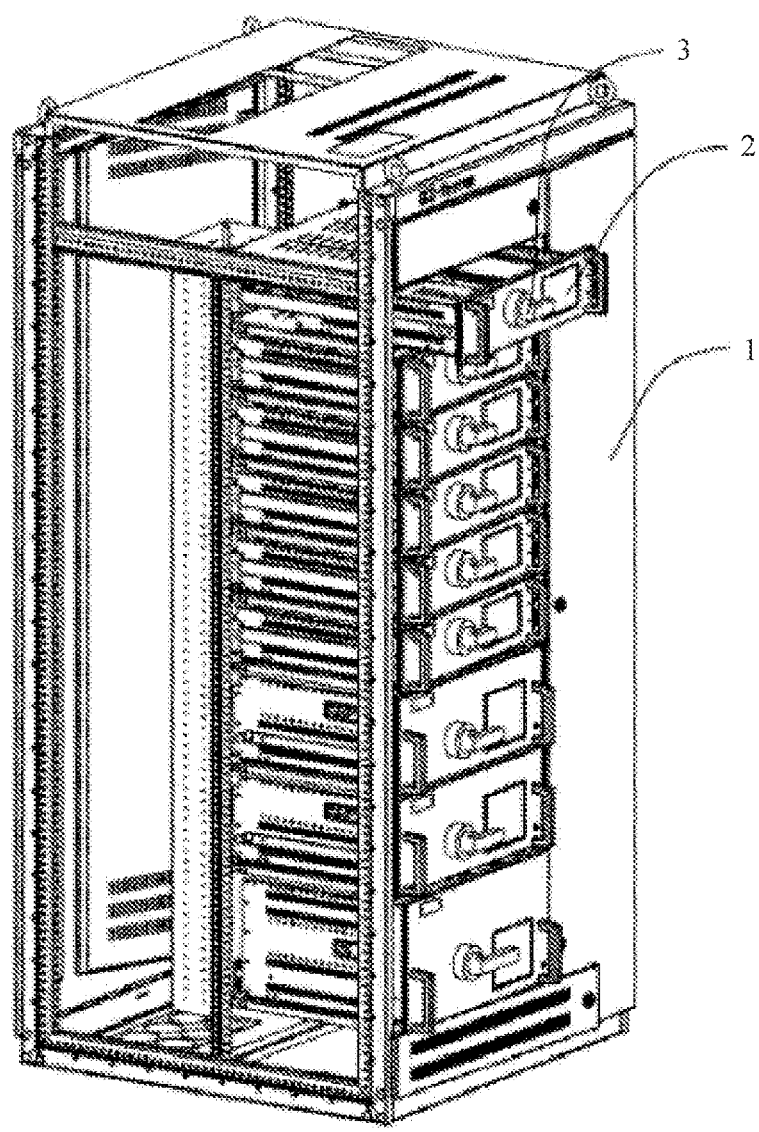
FIG. 1 is a schematic structural diagram of this embodiment.

As shown in FIG. 1, a dust-proof switch cabinet in low-voltage, which comprises a low-voltage switchgear cabinet 1. A plurality of unit drawers 2 are arranged on the low-voltage switchgear cabinet 1, and each unit drawer 2 is provided with a locking push-pull mechanism 3 for locking the unit drawers 2 in the low-voltage switchgear cabinet 1.

Figure 2:
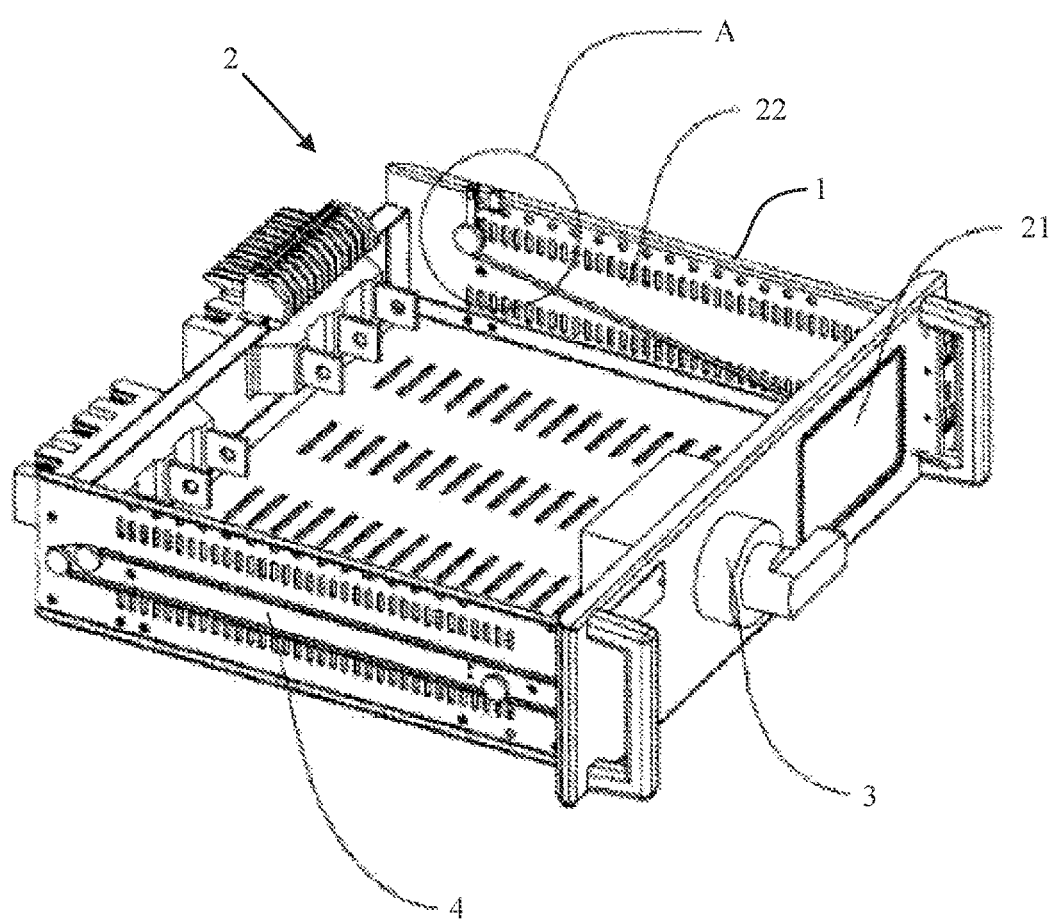
FIG. 2 is a schematic structural diagram of the unit drawers of this embodiment.
Figure 3:
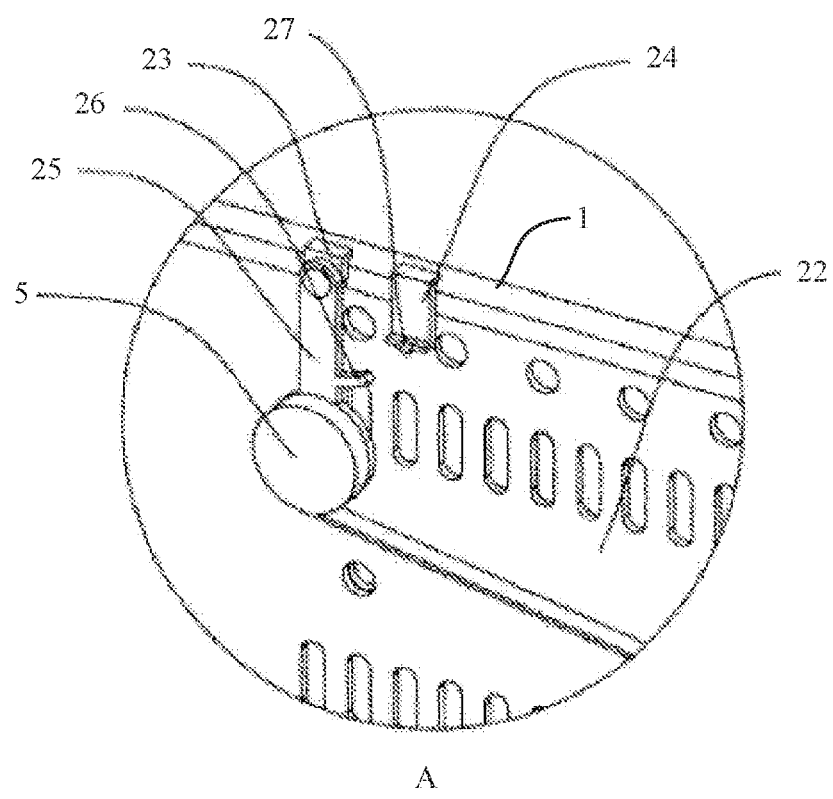
FIG. 3 is a schematic diagram of an enlarged structure of part A in FIG. 2.

As shown in FIG. 2 and FIG. 3, the unit drawers 2 are provided with a drawer stop door 21 located on the outside and a drawer side panel 22 located on both sides. A plurality of elastic tensioning members 5 respectively matched with the corresponding unit drawers 2 are further provided in the low-voltage switchgear cabinet 1, wherein the elastic tensioning members 5 are inserted into the inner cavity of the unit drawers 2 and connected with the low-voltage switchgear cabinet 1, and the movable end of the elastic tensioning members 5 are connected with the drawer stop door 21 of the unit drawers 2, and when the unit drawers 2 are drawn out from the low-voltage switchgear cabinet 1, the elastic potential energy of the elastic tensioning members 5 gradually increases. Therefore, when the unit drawers 2 are drawn out from the low-voltage switchgear cabinet 1, the elastic potential energy of the elastic tensioning members 5 gradually increases as the unit drawers 2 are drawn out, thereby forming a tendency of the unit drawers 2 to move into the low-voltage switch cabinet 1. And after the unit drawers 2 are used, the unit drawers 2 will be reset under the recovery action of the elastic tension members 5, so as to avoid the accumulation of particles and debris in the unit drawers 2 due to the unit drawers 2 being opened for a long-time, and significantly improve the dustproof performance of the low-voltage switchgear cabinet.

It should be noted that the elastic tensioning member 5 is a clockwork. The clockwork uses its elastic force to generate power when it is gradually loosened. According to the principle of lever moment, when the clockwork is fully wound up, the maximum moment is generated due to the longest moment lever is achieved, so the front end of the clockwork needs to be output with small force; after running for a period of time, the clockwork that is tightly wound on the clockwork shaft will slowly loosen, causing the energy of the clockwork to decrease, and when the energy is about to run out, due to the shortest moment lever which makes the moment at its end the smallest, and the output force at this time also becomes smaller; the purpose of stable control of the reset of the unit drawers 2 is achieved.

As shown in FIG. 2 and FIG. 3, the elastic tensioning members 5 are rotatably connected with an adapter fixing piece 23 for connecting with the low-voltage switchgear cabinet 1 at the axis, and the rotation range of the elastic tensioning members 5 relative to the adapter fixing piece 23 is 0°-90°. Thus, the elastic tensioning members 5 are rotatably connected with the adapter fixing piece 23, and the use stability of the elastic tensioning members 5 will be significantly improved, and the service life of the elastic tensioning members 5 will be effectively prolonged. The upper end of the adapter fixing piece 23 is fixedly connected to the low-voltage switchgear cabinet 1, and the lower end of the adapter fixing piece 23 is rotatably connected with an adapter arm 25, and the lower end of the adapter arm 25 is rotatably connected with the elastic tensioning members 5. The elastic tensioning members 5 are first rotatably connected with the adapter arm 25, and then rotatably connected with the adapter fixing piece 23 through the adapter arm 25, achieving the effect of further improving the use stability of the elastic tensioning members 5.

As shown in FIG. 3, the low-voltage switchgear cabinet 1 further includes a magnetic fixing piece 24 which is fixed on the low-voltage switchgear cabinet 1 and a magnetic piece 26 is arranged on the adapter arm 25, an alarm light is arranged on the unit drawers 2. At the same time, the magnetic fixing piece 24 is provided with a matching piece 27 which matches the magnetic piece 26, and the magnetic piece 26 is connected to a switchgear which controls the magnetic attraction of the matching piece 27 with the magnetic piece 26, and when the magnetic piece 26 is magnetically connected with the matching piece 27, the alarm light is turned on. In the present embodiment, the matching piece 27 is an iron block, and the magnetic piece 26 is an electromagnet. Therefore, when the unit drawers 2 are withdrawn from the low-voltage switchgear cabinet 1, the magnetic piece 26 abuts against the matching piece 27 with the rotation of the adapter arm 25. At this time, the magnetic piece 26 and the matching piece 27 are magnetically fixed by the switchgear, which will turn on the alarm light and achieves the purpose of reminding the unit drawers 2 are in the open state.

The above is only preferred embodiment of the present patent, and the protection scope of the present patent is not limited to the above embodiment, but all technical solutions under the idea of the present patent belong to the protection scope of the present patent. It should be pointed out that for those of ordinary skill in the art, several modifications and changes made without departing from the principles of the present patent should also be regarded as the protection scope of the present patent.

What is claimed:

1. A dust-proof switch cabinet assembly in low-voltage comprising:
   a low-voltage switchgear cabinet,
   a plurality of unit drawers are arranged in the low-voltage switchgear cabinet, wherein each of the unit drawers is provided with a drawer stop door located on an outside of a corresponding one of the unit drawers and a respective drawer side panel located on each side of the corresponding one of the unit drawers, and
   a plurality of elastic tensioning members provided in the low-voltage switchgear cabinet, each of the elastic tensioning members matched with the corresponding one of the unit drawers,
   wherein each of the elastic tensioning members is inserted into an inner cavity of the corresponding one of the unit drawers and connected with the low-voltage switchgear cabinet, and a movable end of each of the elastic tensioning members is connected with the corresponding one of the unit drawers,
   wherein when each of the unit drawers is drawn out from the low-voltage switchgear cabinet, an elastic potential energy of each of the elastic tensioning members gradually increases.

2. The dust-proof switch cabinet assembly in low-voltage according to claim 1, wherein each of the elastic tensioning members is a clockwork.

3. The dust-proof switch cabinet assembly in low-voltage according to claim 1, wherein each of the elastic tensioning members is rotatably connected with an adapter fixing piece for connecting with the low-voltage switchgear cabinet at an axis of the low-voltage switchgear cabinet, and a rotation range of each of the elastic tensioning members relative to the adapter fixing piece is 0°-90°.

4. The dust-proof switch cabinet assembly in low-voltage according to claim 3, wherein an upper end of the adapter fixing piece is fixedly connected to the low-voltage switchgear cabinet, and a lower end of the adapter fixing piece is rotatably connected with an adapter arm, and a lower end of the adapter arm is rotatably connected with a respective one of the elastic tensioning members.

5. The dust-proof switch cabinet assembly in low-voltage according to claim 4, further comprises a magnetic fixing piece which is fixed on the low-voltage switchgear cabinet, an alarm light is arranged on the unit drawers, and a magnetic piece is arranged on the adapter arm, wherein the magnetic fixing piece is provided with a matching piece which matches the magnetic piece, and the magnetic piece is connected to a switchgear which controls the magnetic attraction of the matching piece with the magnetic piece, and when the magnetic piece is magnetically connected with the matching piece, the alarm light is turned on.

6. The dust-proof switch cabinet assembly in low-voltage according to claim 5, wherein the matching piece is an iron block, and the magnetic piece is an electromagnet.

\* \* \* \* \*